United States Patent
Park

(10) Patent No.: US 11,307,862 B2
(45) Date of Patent: *Apr. 19, 2022

(54) COMPILING AND COMBINING INSTRUCTIONS FROM DIFFERENT BRANCHES FOR EXECUTION IN A PROCESSING ELEMENT OF A MULTITHREADED PROCESSOR

(71) Applicant: Imagination Technologies Limited, Kings Langley (GB)

(72) Inventor: Jung-Wook Park, Seoul (KR)

(73) Assignee: Imagination Technologies Limited, Kings Langley (GB)

( * ) Notice: Subject to any disclaimer, the term of this patent is extended or adjusted under 35 U.S.C. 154(b) by 7 days.

This patent is subject to a terminal disclaimer.

(21) Appl. No.: 16/712,778

(22) Filed: Dec. 12, 2019

(65) Prior Publication Data

US 2020/0117466 A1  Apr. 16, 2020

Related U.S. Application Data

(63) Continuation of application No. 14/836,086, filed on Aug. 26, 2015, now Pat. No. 10,534,615.

(30) Foreign Application Priority Data

Aug. 28, 2014 (GB) ................................. 1415210

(51) Int. Cl.
  *G06F 9/38* (2018.01)
  *G06F 15/76* (2006.01)

(52) U.S. Cl.
  CPC .......... *G06F 9/3853* (2013.01); *G06F 9/3851* (2013.01); *G06F 9/3859* (2013.01);
  (Continued)

(58) Field of Classification Search
  CPC ........ G06F 8/433; G06F 8/4441; G06F 8/445; G06F 8/456; G06F 9/3804; G06F 9/3851;
  (Continued)

(56) References Cited

U.S. PATENT DOCUMENTS 5,574,939 A  11/1996  Keckler et al.
5,669,001 A  9/1997  Moreno
(Continued)

FOREIGN PATENT DOCUMENTS

EP  0927930 A1  7/1999

OTHER PUBLICATIONS

Ozer et al., "Weld: A Multithreading Technique Towards Latency-Tolerant VLIW Processors", Dec. 2001, 13 pages.*
(Continued)

*Primary Examiner* — David J. Huisman
(74) *Attorney, Agent, or Firm* — Potomac Law Group, PLLC; Vincent M DeLuca

(57) ABSTRACT

A data processing system includes a processor operable to execute a program partitioned into a number of discrete instructions, the processor having multiple processing elements each capable of executing more than one instruction per cycle, and an interface configured to read a first program and, on detecting a branch operation by that program creating m number of branches each having a different sequence of instructions, combine an instruction from one of the branches with an instruction from at least one other branch so as to cause a processing element to execute the combined instructions during a single cycle.

18 Claims, 6 Drawing Sheets

(52) U.S. Cl.
CPC .......... *G06F 9/3885* (2013.01); *G06F 9/3887*
(2013.01); *G06F 15/76* (2013.01)

(58) Field of Classification Search
CPC .... G06F 9/3853; G06F 9/3859; G06F 9/3885;
G06F 9/46; G06F 9/4881; G06F 15/76;
G06F 9/3887
USPC ......................................................... 712/235
See application file for complete search history.

(56) References Cited

U.S. PATENT DOCUMENTS

| | | | |
|---|---|---|---|
| 5,721,854 | A | 2/1998 | Ebcioglu et al. |
| 5,974,535 | A | 10/1999 | Peng et al. |
| 6,112,299 | A | 8/2000 | Ebcioglu et al. |
| 6,170,051 | B1 | 1/2001 | Dowling |
| 6,684,389 | B1 | 1/2004 | Tanaka et al. |
| 7,127,590 | B1 * | 10/2006 | Lindquist ................ G06F 9/381 |
| | | | 712/29 |
| 9,519,479 | B2 | 12/2016 | Le et al. |
| 10,534,615 | B2 * | 1/2020 | Park ....................... G06F 9/3853 |
| 2001/0042187 | A1 | 11/2001 | Tremblay |
| 2014/0164737 | A1 | 6/2014 | Collange et al. |
| 2014/0317388 | A1 * | 10/2014 | Chung ................ G06F 9/30145 |
| | | | 712/229 |

OTHER PUBLICATIONS

Suijkerbuijk et al., "Implementing Hadrware Multithreading in a VLIW Architecture", Jan. 2005, 7 pages.*
Fung et al., "Dynamic Warp Formation and Scheduling for Efficient GPU Control Flow," IEEE Computer Society, 40th International Symposium on Microarchitecture, 2007, pp. 407-418.
Fung et al., "Thread Block Compaction for Efficient SIMT Control Flow," 17th International Conference on High-Performance Computer Architecture (HPCA-17 2011), Feb. 12-16, 2011, San Antonio, Texas, USA.
Meng et al., "Dynamic Warp Subdivision for Integrated Branch and Memory Divergence Tolerance," 37th International Symposium on Computer Architecture (ISCA 2010), Jun. 19-23, 2010, Saint-Malo, France.
Narasiman et al., "Improving GPU Performance via Large Warps and Two-Level Warp Scheduling," MICRO-44 Proceedings of the 44th Annual IEEE/ACM International Symposium on Microarchitecture, At Porto Alegre, Brazil.
*(Note: NPL copies in parent application)*.

* cited by examiner

|  105  |  106  |  107  |  108  | Cycle |
|---|---|---|---|---|
| 0 | 0 | 0 | 0 | 1 |
| 1, 2 | 1, 2 | 1, 2 | 1, 2 | 2 |
| 3, 4 | 3, 4 | 3, 4 | 3, 4 | 3 |
| 5 | 5 | 5 | 5 | 4 |
| 6, 7 | | | | 5 |
| 8 | | | | 6 |
| 9, 10 | | | | 7 |
| 11 | | | | 8 |
| | 12 | 12 | 12 | 9 |
| | 13 | 13 | 13 | 10 |
| | 14, 15 | 14, 15 | 14, 15 | 11 |
| | 16, 17 | 16, 17 | 16, 17 | 12 |
| 18, 19 | 18, 19 | 18, 19 | 18, 19 | 13 |
| 20 | 20 | 20 | 20 | 14 |

FIG. 1B

| 105 | 106 | 107 | 108 | Cycle |
|---|---|---|---|---|
| 0 | 0 | 0 | 0 | 1 |
| 1, 2 | 1, 2 | 1, 2 | 1, 2 | 2 |
| 3, 4 | 3, 4 | 3, 4 | 3, 4 | 3 |
| 5 | 5 | 5 | 5 | 4 |
| 6, 12 | 6, 12 | 6, 12 | 6, 12 | 5 |
| 7, 13 | 7, 13 | 7, 13 | 7, 13 | 6 |
| 8, 14 | 8, 14 | 8, 14 | 8, 14 | 7 |
| 9, 15 | 9, 15 | 9, 15 | 9, 15 | 8 |
| 10, 16 | 10, 16 | 10, 16 | 10, 16 | 9 |
| 11, 17 | 11, 17 | 11, 17 | 11, 17 | 10 |
| 18, 19 | 18, 19 | 18, 19 | 18, 19 | 11 |
| 20 | 20 | 20 | 20 | 12 |

FIG. 2

| 105 | 106 | 107 | 108 | Cycle |
|---|---|---|---|---|
| 0 | 0 | 0 | 0 | 1 |
| 1, 2 | 1, 2 | 1, 2 | 1, 2 | 2 |
| 3, 4 | 3, 4 | 3, 4 | 3, 4 | 3 |
| 5 | 5 | 5 | 5 | 4 |
| 6, 7 | 6, 7 | 6, 7 | 6, 7 | 5 |
| 8, 12 | 8, 12 | 8, 12 | 8, 12 | 6 |
| 9, 10 | 9, 10 | 9, 10 | 9, 10 | 7 |
| 11, 13 | 11, 13 | 11, 13 | 11, 13 | 8 |
| 14, 15 | 14, 15 | 14, 15 | 14, 15 | 9 |
| 16, 17 | 16, 17 | 16, 17 | 16, 17 | 10 |
| 18, 19 | 18, 19 | 18, 19 | 18, 19 | 11 |
| 20 | 20 | 20 | 20 | 12 |

FIG. 3

COMPILING AND COMBINING INSTRUCTIONS FROM DIFFERENT BRANCHES FOR EXECUTION IN A PROCESSING ELEMENT OF A MULTITHREADED PROCESSOR

BACKGROUND OF THE INVENTION

This invention relates to efficiently executing instructions at a processor.

With some types of data, such as graphics data, large blocks of data often need to undergo the same processing operations. One example is when changing the brightness of an image. Processing such blocks of data in parallel can reduce the processing time compared with serial processing. Parallel processing can be carried out on a single instruction multiple thread (SIMT) or single instruction multiple data (SIMD) processor, which are microprocessors with execution units, caches and memories as with any other processor, but additionally incorporates the concept of parallel execution of multiple threads or data streams. Each thread executes the same set of instructions but on different data which, instead of having each thread individually fetch data from memory, can be provided to the threads by a single fetch operation to fetch a block of data for each of the threads. SIMT and SIMD processing can provide improved processing efficiency as compared with traditional single instruction single data (SISD) processing.

SIMT and SIMD processors comprise a plurality of processing elements that can concurrently execute the same instructions. Each processing element supports its own thread and each thread runs the same program code, but with different data. One problem with SIMT and SIMD processing is the high cost of a branch operation (as might be caused by a conditional statement in the program code) which results in some data in a block being operated on by one branch of instructions and the remaining data by another branch of instructions the identity of which is not known until the condition has been met. Such an operation can cause idling and underutilisation of processing elements as well as an increase in the processing time for the program. There is therefore a need for more efficient parallel processing of programs that have branching operations.

BRIEF SUMMARY OF THE INVENTION

According to a first aspect there is provided a data processing system comprising: a processor operable to execute a program partitioned into a plurality of discrete instructions, the processor comprising a plurality of processing elements, each processing element capable of executing n instructions per cycle, wherein n is greater than 1; and an interface configured to, on detecting a branch operation by a program creating m number of branches each having a different sequence of instructions, combine an instruction from one of the branches with an instruction from at least one of other branch so as to cause a processing element to execute the combined instructions during a single cycle.

m may be greater than 1.

m may be less than n. Alternatively, m and n may be equal.

Instructions from each of the branches may be combined so as to cause each processing element to execute at least one instruction from each branch per cycle.

The processor may be configured such that, per cycle, each processing element executes the same instructions as the other processing elements.

The sequence of instructions for each branch may be independent from the sequence of instructions of the other branches.

Each sequence of instructions may comprise at least one instruction that is dependent on a previous instruction in the sequence and at least one instruction that is independent on a previous instruction in the sequence.

Each sequence of instructions may comprise n sequential instructions that are capable of being executed in parallel and n sequential instructions that are not capable of being executed in parallel.

The branches may be created in accordance with the program.

The data processing system may further comprise a compiler configured to read the program and compile the program into a plurality of instructions.

The interface may be configured to mimic a processor comprising a plurality of processing elements, each processing element being capable of executing no more than one instruction per cycle.

The interface may be configured to generate a message comprising parameters of said mimicked processor and send the message to the compiler.

The interface may comprise a compiler configured to read the program and compile the program into a plurality of instructions.

The processor may be a GPU (Graphics Processing Unit) and the compiler may be configured to generate instructions for the processing elements from OpenCL code.

The processor may be capable of concurrently supporting a plurality of threads. The processor may be a single instruction multiple thread (SIMT) processor.

The processor may be an n-way VLIW processor.

The data processing system may further comprise masking logic configured to prevent the processing element from executing one of the instructions in the combined instruction and allow execution the other instruction in the combined instruction during the single cycle.

According to a second aspect there is provided compiler for compiling a program into a plurality of instructions executable at a processor comprising a plurality of processing elements, each processing element capable of executing n instructions per cycle, wherein n is greater than 1, the compiler being configured to: read the program and, on detecting a branch operation creating m number of branches and each branch having a different sequence of instructions, combine an instruction from one of the branches with an instruction from at least one other branch so as to cause a processing element to execute the combined instructions during a single cycle.

According to a third aspect there is provided a method for a processor operable to execute a program partitioned into a plurality of discrete instructions, the processor comprising a plurality of processing elements, each processing element capable of executing n instructions per cycle, wherein n is greater than 1, the method comprising: on detecting a branch operation by a program creating m number of branches each having a different sequence of instructions, combining an instruction from one of the branches with an instruction from at least one other branch so as to cause a processing element to execute the combined instructions during a single cycle.

According to a fourth aspect there is provided machine readable code for generating the data processing system described above.

According to a fifth aspect there is provided a machine readable storage medium having encoded thereon non-transitory machine readable code for generating the data processing system described above.

According to a sixth aspect there is provided a data processing system and/or method substantially as described herein with reference to any of FIGS. 1-5.

BRIEF DESCRIPTION OF THE DRAWINGS

The present invention will now be described by way of example with reference to the accompanying drawings. In the drawings:

FIG. 1B illustrates conventional processing of the example program;

FIG. 2 illustrates a faster way of processing of the example program;

FIG. 3 illustrates another faster way of processing the example program;

DETAILED DESCRIPTION

The following description is presented by way of example to enable any person skilled in the art to make and use the invention. The present invention is not limited to the embodiments described herein and various modifications to the disclosed embodiments will be readily apparent to those skilled in the art.

Figure 1A:
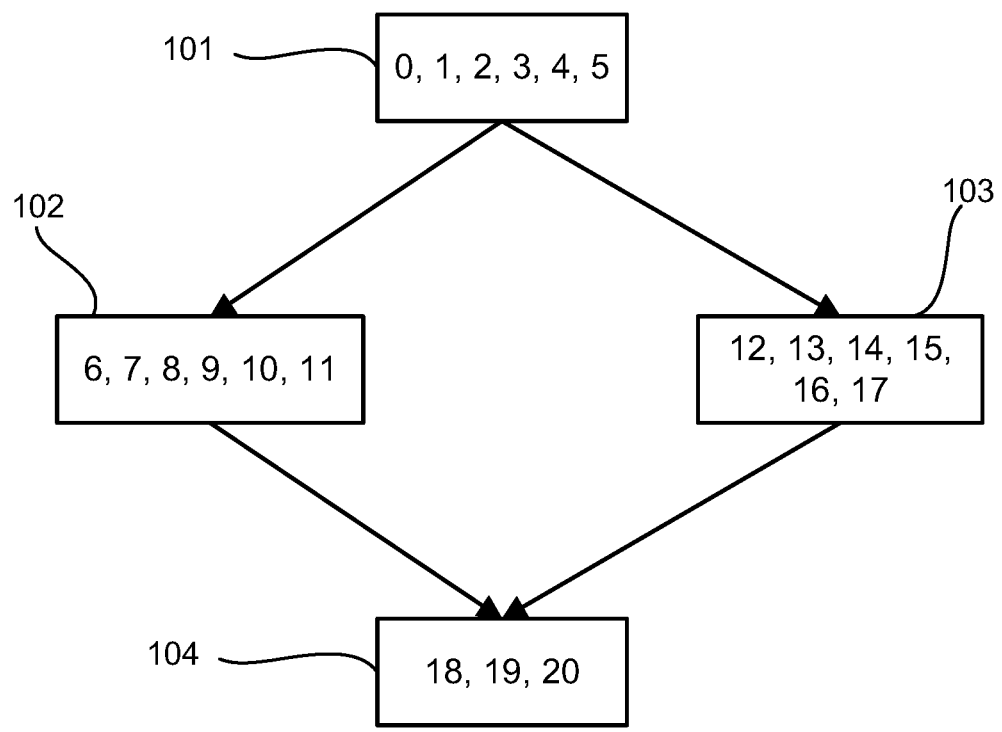
FIG. 1A illustrates branching for an example program.

FIGS. 1A and 1B illustrate a problem caused by branch divergence at an example SIMT processor with 4 processing elements. Each processing element in this example is a very long instruction word (VLIW) processor. In this example, each processing element is a two-way VLIW that is capable of executing two instructions per cycle.

FIG. 1A illustrates how the instructions compiled from an example program diverge when the program has a conditional statement such as an if-then-else statement. Initially at 101, the program is compiled into sequence of instructions 0 to 5. Then a branching operation creates two branches, each with different instructions and each independent from each other. A first branch 102 has a sequence of instructions 6 to 11 and a second branch 103 has a different sequence of instructions 12 to 17. The branches then converge at 104 to have the same sequence of instructions 18 to 20.

FIG. 1B illustrates how the instructions of FIG. 1A would conventionally be executed on the SIMT processor described above. Each thread 105 to 108 is executed at its own respective processing element. Initially, each thread is the same as each processing element executes the same instructions at each cycle for instructions 0 to 5.

As each processing element is a two-way VLIW, two instructions can be executed during a single cycle time, as illustrated at the second cycle where instructions 1 and 2 are executed and the third cycle where instructions 3 and 4 are executed. Instructions 2 and 4 are not dependent on previous instructions 1 and 3 respectively and thus instructions 2 and 4 can be executed in parallel with instructions 1 and 3 respectively. Some instructions may be dependent on previous instructions, and thus those instructions can only be executed when the previous dependent instruction has been executed. For example, instruction 1 is dependent on instruction 0 and thus, instructions 0 and 1 cannot be executed in parallel and so a single instruction is executed at the processing elements at the first cycle even though they are each capable of executing two instructions per cycle. This means that, generally, the full resources of each processing element may not always be utilised when executing a program.

As described above, branching then occurs after instruction 5. Thread 105 branches to the first branch 102, which has instruction sequence 6 to 11, and threads 106 to 108 branch to the second branch 103, which has instruction sequence 12 to 17. During each cycle, a processing element of the SIMT processor cannot execute instructions that are different from the other elements (i.e. the processing elements work in lockstep, thus the "single instruction" of the SIMT). Thus, during the cycles when instructions 6 to 11 are executed in the thread 105, the processing elements for the other threads 106 to 108 do not execute any instructions. This can be achieved using masking logic which causes the processing element for threads 106 to 108 to 10 not participate during cycles 5 to 8. Once the instructions for the first branch 102 have been executed, the instructions for the second branch 103 can begin for threads 106 to 108. During the cycles when instructions 12 to 17 are executed, the masking logic is flipped and the processing element for thread 105 does not execute any instructions. Thus branching for an SIMT processor causes some of the processing elements to not be utilised, which leads to an increase in the cycle time.

Once the instructions for the second branch 103 have been completed, the branches again converge to execute the same instructions 18 to 20.

As mentioned above, some instructions can be executed in parallel and others can only be executed after execution of a previous, dependent instruction. This is demonstrated in FIG. 1*b*, where instructions 6 and 7 are independent of each other and thus can be executed in parallel. Instructions 9 and 10, 14 and 15, and 16 and 17 can similarly be executed in parallel. Instructions 9, 13 and 14 are dependent on previous instructions 8, 12 and 13 respectively, and thus cannot be executed together with their previous instruction and so they are executed at the next cycle. Thus, when executing some instructions, not all of the resource of the processing element is fully utilised.

FIG. 2 illustrates a more efficient method of executing the instructions from the branched program of FIG. 1*a*. As before, prior to branching, instructions 0 to 5 are executed in lockstep at each thread over 4 cycles. Also as before, thread 105 takes the path of the first branch 102 and threads 106 to 108 take the path of the second branch 103. In this example, branches 102 and 103 are merged so that at each cycle, each processing element executes an instruction from the first branch 102 and an instruction from the second branch 103. An instruction from each branch can be merged with an instruction from the other branch and processed in parallel at a processing element during the same cycle because the branches are independent (i.e. each instruction in one branch doesn't depend on any instruction in the other branch). Thus, the execution of instructions for branches 102 and 103 are completed in six cycles compared with the eight cycles required to execute the same branches using the conventional method described in FIG. 1*b*. Thus, the processing time for a program with a branch operation can be reduced.

At the final cycle of the branched processing (the tenth cycle), each thread maintains the data for its branch path and discards the data for the other branch. For example, thread 105, which follows branch 102, maintains the data from the execution of instruction 11 and discards the data from the execution of instruction 17. Similarly, threads 106 to 108, which follow branch 103, each maintain the data from the execution of instruction 17 and discard the data from the execution of instruction 11. Branches 102 and 103 then converge so that each thread 105 to 108 executes instructions 18 and 19 at the same time. Although data is discarded using this method, the number of cycles required to execute the instructions from both branches 102 and 103 is reduced, which leads to faster processing of the program.

FIG. 3 illustrates another way of merging the instructions from the branches 102 and 103. At the fifth cycle, each processing element initially executes instructions 6 and 7 from the first branch 102. Then at the sixth cycle, instruction 8 from the first branch 102 is executed together with instruction 12 from the second branch at each processing element. Instruction 8 is executed with instruction 12 instead of instruction 9 because instruction 9 is dependent on instruction 8 and thus they cannot be processed in parallel, while instruction 12 is dependent on instruction 5, which has been executed. The data from the execution of instruction 12 is saved in memory and used at a later cycle. The remaining instructions from the first branch 102 then continue to be executed for each thread. At the eighth cycle, the last instruction (instruction 11) from the first branch 102 is executed together with the first instruction yet to be executed (instruction 13) from the second branch 103. Instruction 13 is dependent on instruction 12, which has previously been executed and the data therefrom saved at a different cycle (the sixth cycle) and thus instruction 13 can be executed with instruction 11. Thus, at the sixth and eighth cycles, each processing element executes an instruction from each branch. The remaining instructions for the second branch 103 are then executed for each thread 105 to 108. This way of merging the instructions also leads to the branches being executed over six cycles, rather than the eight cycles required from the example in FIG. 1*b*.

Conventionally, when branching that causes the processing elements to take different paths occurs, some of those processing elements are masked out so they do not participate during certain cycles. This can be achieved through the use of mask bits at masking logic of the processor. In the examples of FIGS. 2 and 3, when branching occurs (e.g. at cycles 5-10), masking logic at the processor is configured such that all of the processing elements participate in executing instructions.

In the examples described above, each processing element is capable of executing two instructions per cycle. However, the processing elements could be capable of executing more than two instructions per cycle. For example, the processing element could be a 3-way, 4-way, 5-way, or 8-way VLIW processor that is respectively capable of processing 3, 4, 5 or 8 instructions per cycle.

The instructions from each branch could be merged so that there is an equal split in the number of instructions from each branch processed per cycle. For example, in the case of a processor having 4-way VLIW processing elements and two branches to be processed, two instructions from each of the two branches could be executed at each processing element at each cycle. The number of instructions from each branch could also be unequal. Using the same example, there could be three instructions from one of the branches and one instruction from the other branch executed at each processing element at each cycle. The way that the instructions from different branches are merged could be dependent on whether instructions can be executed in parallel or not. In other words, the split of the instructions from each branch could be dependent on whether an instruction is dependent or independent on a preceding instruction in the sequence for each branch.

In the examples described above, the program branches to two branches. However, the program may branch to more than two branches. The number of branches that are capable of being executed efficiently by the method described herein is dependent on the number of instructions each processing element can execute per cycle. At a minimum, it is preferable that the number of instructions each processing element can execute per cycle is the same as the number of branches created by the program. Generally, the number of cycles for processing branches can be reduced by providing processing elements that can execute a greater number of instructions per cycle.

Each branch may have an unequal number of instructions. In this case, the branch with the greater number of instructions continues to be executed at each processing element after all of the instructions from the shorter branch have been executed.

Figure 4:
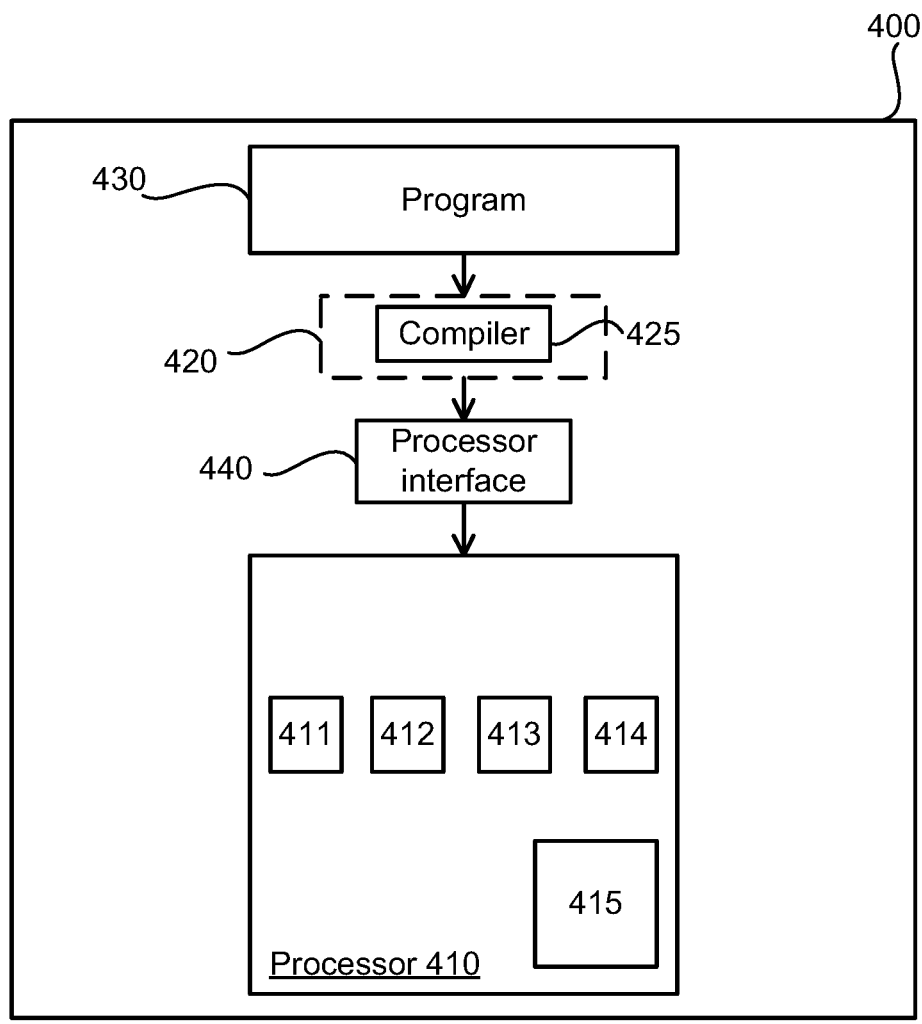
FIG. 4 is a schematic diagram of a data processing system capable of processing the program.

FIG. 4 is a schematic illustration of a data processing system 400 capable of performing the method described herein of executing instructions from a branched program.

The data processing system 400 comprises a processor 410 which is capable of executing instructions. The data processing system 400 may comprise an interface 420 which enables a program 430 to be executed at the processor 410. The interface 420 may include a compiler 425 that can compile the program into instructions for execution at the processor 410. The compiler 425 is capable of reading a program 430 and partitioning that program 430 into a sequence of discrete instructions that are capable of being executed by the processor 410. The compiler 425 may directly read the program 430 or indirectly read the program 430 via a translation of the program language into a language readable by the compiler 425. The program 430 may be coded using a programming language such as OpenCL, OpenGL, GLSL, C, C++, Fortran, etc. The interface 420 may be a framework such as OpenCL, OpenGL, CUDA, etc and the compiler may be configured to operate according to the framework. For example, the interface 420 may be the OpenCL framework, which is controlled by a host CPU (which may be different to processor 410). The host CPU can call appropriate OpenCL functions when needed to compile and execute program 430 at the processor 410.

Processor 410 may be a graphics processing unit (GPU) or a central processing unit (CPU). Processor 410 may be a SIMT or SIMD processor or any type of parallel processor that is able to carry out multiple executions of the same instruction at the same time. The processor 410 comprises a plurality of processing elements. In this example, the processor comprises four processing elements 411 to 414. Each processing element 411 to 414 can comprise a plurality of arithmetic logic units (ALUs) and/or floating point units (FPU) for carrying out operations according to the instructions. Each processing element 411 to 414 may be an n-way VLIW processor, where n is greater than one. Each processing element 411 to 414 is capable of executing n or less-than-n instructions over a processor clock cycle.

The processor 410 also comprises masking logic 415. The masking logic 415 can be configured to allow all of the processing elements 411 to 414 to participate in executing instructions as described herein when there is a branching operation.

In one embodiment, the masking logic may be configured to mask one or more of the ALUs and or FPUs of each processing element 411 to 414 to selectively prevent an instruction being carried out. For example, in FIG. 2, although instructions 6 and 12, 7 and 13, . . . 11 and 17 are to be executed on each thread 105 to 108, the masking logic may mask out the instruction that is not relevant for that thread. At cycle 5, the masking logic can mask out instruction 12 for thread 105 and mask out instruction 6 for threads 106 to 108. Similarly, at cycle 6, the masking logic can mask out instruction 13 for thread 105 and mask out instruction 7 for threads 106 to 108. Similarly, masking in this way is carried out to cycle 10. This way, the execution of instructions for the branch that is not relevant for that thread can be avoided.

The data processing system 400 also comprises a processor interface 440 between interface 420 and the processor 410. The processor interface 440 can cause the compiler 425 to compile instructions in a way that would be suitable for processing elements that are only capable of executing one instruction per cycle even though each processing element 411-414 is capable of executing a plurality of instructions per cycle. When the interface 420 or compiler 425 queries the processor 410 to determine its capabilities, the processor interface 440 intercepts the query and responds to the query with a message having parameters that mimic a processor that has multiple processing elements that are each capable of executing one instruction per cycle. In other words, processor interface 440 causes the interface 420 and compiler 425 to believe that the processor 410 is a single-issue processor and thus it compiles instructions accordingly.

The compiled instructions are sent to or intercepted by the processor interface 440, which then merges the instructions so that multiple instructions are executed at each processing element 411-414 in the manner described above with reference to FIGS. 2 and 3. For example, for the program to be processed in FIGS. 2 and 3, when the program is converged (e.g. instructions 0-5), the processor interface 440 receives the instructions and merges the independent instructions (instructions 1 and 2 and instructions 3 and 4) so that they can be executed by the processing elements. The processor interface 440 then provides the unmerged (instructions 0 and 5) and merged instructions (instructions 1 and 2 and instructions 3 and 4) to the processor 410. When the program is diverged because of a branch operation, the processor interface 440 receives the instructions for each branch (instructions 6-11 and instructions 12-17 respectively) and merges them as described above. The merged instructions are then sent to the processor 410.

By providing a processor interface 440, a standard compiler (e.g. an OpenCL compiler) can be used without modification. Alternatively, the processor interface 440 may be omitted and the compiler 425 of the interface 420 can be configured such that it compiles instructions in the manner described above. Some or all of the functions carried out by processor interface 440 may be carried out by the compiler 425. For example, compiler 425 may comprise a front-end (which may include parsing and manipulating syntax and semantics and generating an intermediate representation), a middle-end (for, e.g., providing a functional optimisation) and back-end (for, e.g., providing machine specific optimisation and final binary code generation). The processor interface 440 (or some of the functions of the interface 440) may be implemented at the back-end part of the compiler 425.

In the examples described above, the processing elements are VLIW processors. However, the processing elements could be superscalar processors that are capable of executing multiple instructions per cycle. For a superscalar processor, the available processing resources are dynamically and automatically searched in runtime and the instruction merging during branching described above can be performed by a hardware instruction scheduler.

Figure 5:
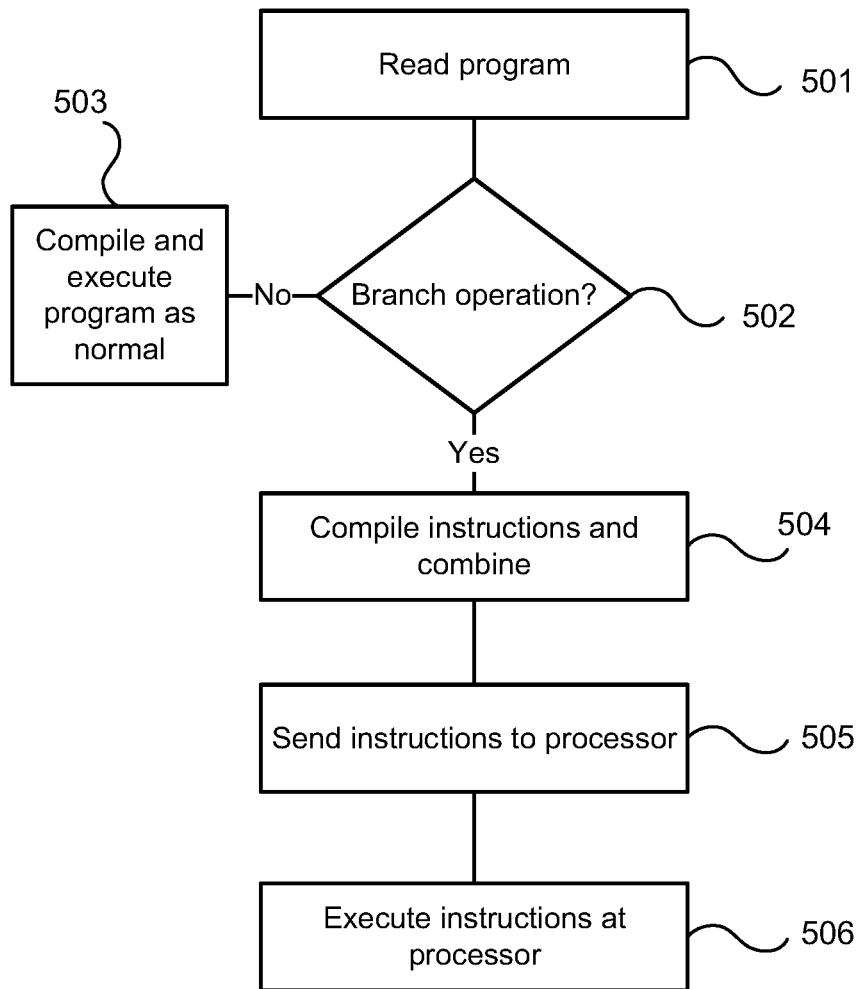
FIG. 5 is a flow diagram for processing a program.

FIG. 5 is a flow diagram which describes a method of processing program 430. At step 501, the program is read. At step 502, it is determined if the program 430 has a branch operation. When a branch operation is detected, the process moves on to step 504. If there is no branch operation in the program, the process ends and the program is processed as normal (step 503). At step 504, compiled instructions from the branches are combined as described above. The instructions can be combined (at interface 440) after being compiled or combined at the compiler as described above. The combined instructions are sent to the processor at step 505. At step 506 the processing elements of the processor execute the combined instructions as described above. The process may be repeated for each branch operation in each program to be executed.

The data processing system of FIG. 4 is shown as comprising a number of functional blocks, such as the interface 420, compiler 425 and the interface 440. This is schematic only and is not intended to define a strict division between different logic elements of a data processing system. Each functional block can be provided in any suitable manner.

The terms software and computer readable program code as used herein includes executable code for processors (e.g. CPUs and/or GPUs), firmware, bytecode, programming language code such as C, OpenCL or OpenGL, and modules for reconfigurable logic devices such as FPGAs. Machine-readable code and instructions includes software and code for defining hardware representations of integrated circuits at any level, including at register transfer level (RTL), at high-level circuit representations such as Verilog or VHDL, and lower-level representations such as OASIS and GDSII.

The algorithms and methods described herein could be performed by one or more physical processing units executing software that causes the unit(s) to perform the algorithms/methods. The or each physical processing unit could be any suitable processor, such as a CPU or GPU (or a core thereof), or fixed function or programmable hardware. The software could be stored in non-transitory form at a machine readable medium such as an integrated circuit memory, or optical or magnetic storage. A machine readable medium might comprise several memories, such as on-chip memories, computer working memories, and non-volatile storage devices.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A data processing system comprising:
   a first processor operable to execute a program partitioned into a plurality of discrete instructions, the first processor comprising a plurality of processing elements, each processing element capable of executing n instructions per cycle, wherein n is an integer greater than 1; and
   an interface configured to mimic a processor comprising a plurality of processing elements each being capable of executing no more than one instruction per cycle, the interface further configured to, on detecting a branch operation by the program creating m number of branches each having a different sequence of instructions, wherein m is an integer greater than 1, cause a compiler to compile the sequence of instructions from each branch so as to be suitable for processing elements that are only capable of executing one instruction per cycle, and combine an instruction from one of the branches with an instruction from at least one other branch to form a combined instruction so as to cause at least one processing element to execute the combined instruction during a single cycle.

2. A data processing system as claimed in claim 1, wherein m is less than n.

3. A data processing system as claimed in claim 1, wherein m and n are equal.

4. A data processing system as claimed in claim 1, wherein instructions from each of the branches are combined so as to cause each processing element of the first processor to execute at least one instruction from each branch per cycle.

5. A data processing system as claimed in claim 1, wherein the first processor is configured such that, per cycle, all processing elements of the first processor execute the same instructions.

6. A data processing system as claimed in claim 1, wherein the sequence of instructions for each branch is independent from the sequence of instructions of the at least one other branch.

7. A data processing system as claimed in claim 1, wherein each sequence of instructions comprises at least one instruction that is dependent on a previous instruction in that sequence and at least one instruction that is independent of a previous instruction in that sequence.

8. A data processing system as claimed in claim 1, wherein each sequence of instructions comprises n sequential instructions that are capable of being executed in parallel and n sequential instructions that are not capable of being executed in parallel.

9. A data processing system as claimed in claim 1, wherein the branches are created in accordance with the program.

10. A data processing system as claimed in claim 1, wherein the interface is configured to generate a message comprising parameters of the mimicked processor and send the message to the compiler.

11. A data processing system as claimed in claim 1, wherein the compiler is configured to read the program and compile the program into a plurality of processing element executable instructions.

12. A data processing system as claimed in claim 1, wherein the first processor is a graphics processing unit (GPU) and the compiler is configured to generate instructions for processing elements from Open Computing Language (OpenCL) code.

13. A data processing system as claimed in claim 1, wherein the first processor is capable of concurrently supporting a plurality of threads.

14. A data processing system as claimed in claim 1, wherein the first processor is a single instruction multiple thread (SIMT) processor.

15. A data processing system as claimed in claim 1, wherein each processing element of the first processor is an n-way very long instruction word (VLIW) processor.

16. A data processing system as claimed in claim 1, further comprising a masking logic circuit configured to prevent the at least one processing element from executing one of the instructions in the combined instruction and allow execution of another instruction in the combined instruction prior to the at least one processing element executing the combined instruction during the single cycle.

17. A non-transitory computer readable storage medium having stored thereon a compiler comprising computer readable code, said compiler being configured to compile a program into a plurality of instructions executable at a data processing system comprising a first processor having a plurality of processing elements, each processing element capable of executing n instructions per cycle, wherein n is an integer greater than 1, and an interface configured to mimic a plurality of processing elements each being capable of executing no more than one instruction per cycle, the compiler being configured to:
read the program and, on detecting a branch operation creating m number of branches wherein m is an integer greater than 1, each branch having a different sequence of instructions, compile the sequence of instructions from each branch so as to be suitable for processing elements that are only capable of executing one instruction per cycle, and combine an instruction from one of the branches with an instruction from at least one other branch to form a combined instruction so as to cause at least one processing element to execute the combined instruction during a single cycle.

18. A method of executing a program partitioned into a plurality of discrete instructions, comprising:
detecting a branch operation by a program creating m number of branches, wherein m is an integer greater than 1, each branch having a different sequence of instructions;
mimicking a processor comprising a plurality of processing elements each being capable of executing no more than one instruction per cycle;
causing a compiler to compile the sequence of instructions from each branch so as to be suitable for processing elements that are only capable of executing one instruction per cycle;
combining an instruction from one of the branches with an instruction from at least one other branch to form a combined instruction; and
causing at least one processing element of a first processor having a plurality of processing elements each capable of executing more than one instruction per cycle to execute the combined instruction during a single cycle.

* * * * *